United States Patent [19]

Messina

[11] Patent Number: 4,821,882
[45] Date of Patent: Apr. 18, 1989

[54] INSULATED RECEPTACLE DEVICE FOR CASSETTES

[76] Inventor: Eugene C. Messina, Rte. 1, Box 217 K5, Comfort, Tex. 78013

[21] Appl. No.: 177,753

[22] Filed: Apr. 5, 1988

[51] Int. Cl.$^4$ ............................................. B65D 85/672
[52] U.S. Cl. ...................... 206/387; D3/35; 206/523; 220/468
[58] Field of Search .............. D3/35; 206/307, 309, 206/387, 523; 220/444, 467, 468

[56] References Cited

U.S. PATENT DOCUMENTS

| | | | |
|---|---|---|---|
| 3,613,871 | 10/1971 | Evans | 206/387 |
| 3,866,751 | 2/1975 | Holert | 206/387 |
| 3,871,521 | 3/1975 | Szatkowski | 220/444 |
| 3,893,585 | 7/1973 | Morrison et al. | 206/387 |
| 4,002,355 | 1/1977 | Sendor | 206/387 |
| 4,106,597 | 8/1978 | Shook et al. | 206/523 |
| 4,203,519 | 5/1980 | Fujitaki | 206/387 |
| 4,240,240 | 12/1980 | Cohen | 206/523 |
| 4,330,161 | 5/1982 | Khawand | 312/9 |
| 4,411,481 | 10/1983 | Berkman | 312/8 |
| 4,423,812 | 1/1984 | Sato | 206/387 |
| 4,432,453 | 2/1984 | Berkman | 206/387 |

FOREIGN PATENT DOCUMENTS

| | | | |
|---|---|---|---|
| 0037552 | 5/1927 | Denmark | 206/564 |
| 0086542 | 8/1983 | European Pat. Off. | 206/387 |

*Primary Examiner*—Jimmy G. Foster
*Attorney, Agent, or Firm*—Henderson & Sturm

[57] ABSTRACT

An insulated receptacle device (10) for a plurality of cassette cartridges (100) wherein the device (10) comprises an upper (13) and a lower (14) insulated member disposed in an upper (18) and a lower (19) housing member wherein the upper (13) and lower (14) insulated members are provided with contoured central recesses (15)(15') which define an enlarged contoured cavity (17) that will receive the plurality of cassette cartridges (100) in a staggered relationship such that the upper portion of the faces (101) of the individual cartridges will be exposed for visual inspection.

3 Claims, 1 Drawing Sheet

U.S. Patent
Apr. 18, 1989
4,821,882
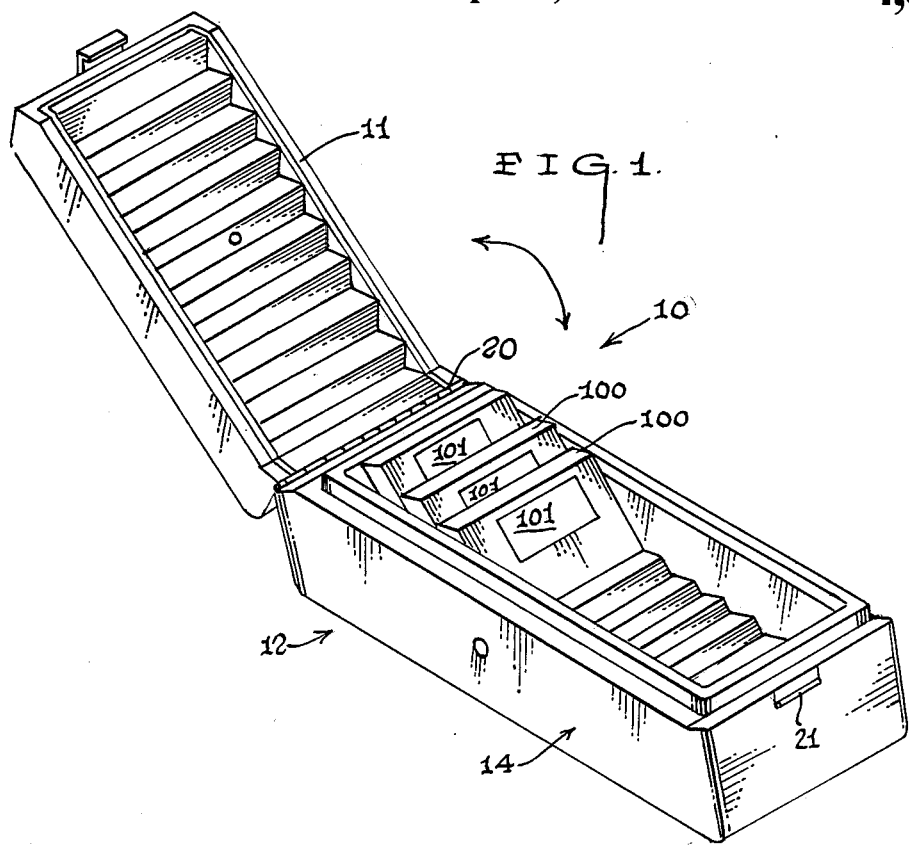
FIG. 1.
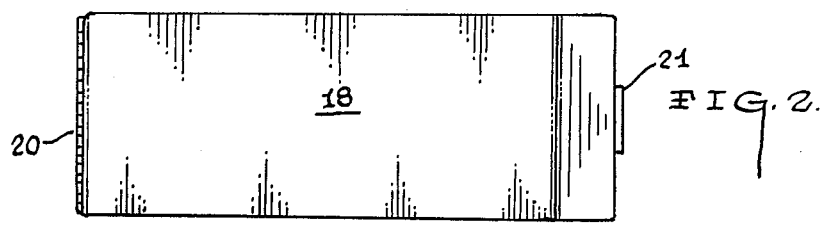
FIG. 2.
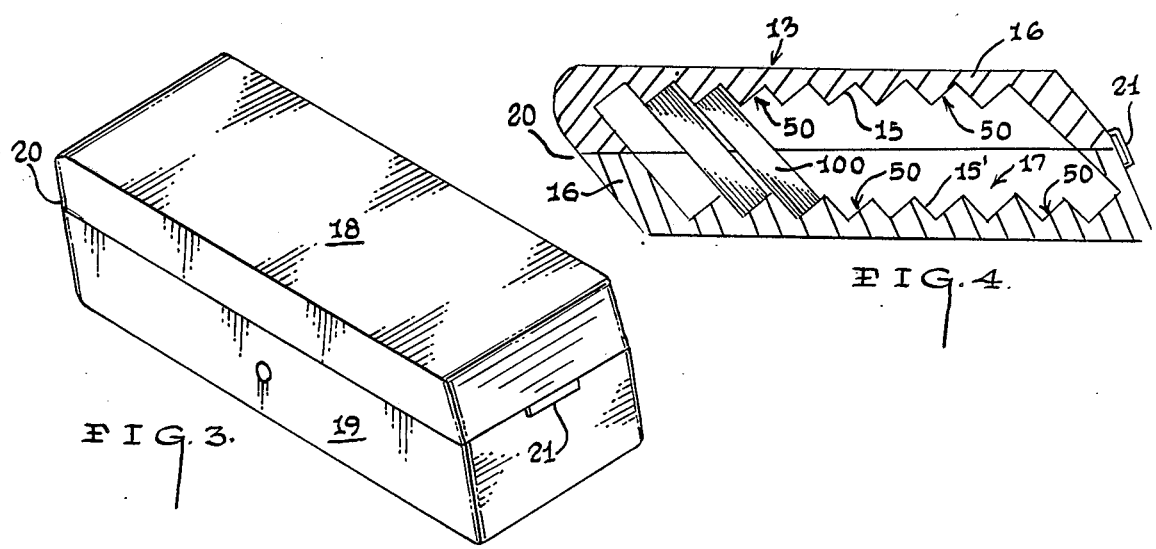
FIG. 3.
FIG. 4.

INSULATED RECEPTACLE DEVICE FOR CASSETTES

TECHNICAL FIELD

The present invention relates generally to a receptacle for audio or video cassettes, and in particular to a receptacle device with means to thermally protect the enclosed cassette tapes.

BACKGROUND OF THE INVENTION

This invention was the subject matter of DDP Registration No. 161508 which was filed in the U.S. Patent and Trademark Office on Jan. 2, 1987.

As can be seen by reference to the following U.S. Pat. Nos.: 4,330,161; 4,411,481; 4,423,812; and 4,432,453, the prior art is replete with myriad and diverse receptacle devices for cassettes.

While the prior art constructions are more than adequate for the purpose and function for which they were specifically designed, they do suffer from a number of shared deficiencies.

For instance, none of the prior art constructions provide a means to insulate and protect cassettes from outside heat. Because of the extreme sensitivity of a typical cassette to excessive heat, such an oversight should never have been permitted by the developers of the prior art constructions.

In addition, the storage disposition employed by the prior art devices obscure the view of the front cover of the cassette cartridge except for the forwardmost cassette. In most instances, manipulation of the individual cassettes is required before any portion of the cassette's front cover is exposed. This arrangement is very impractical due to the fact that the information normally contained on the front face of a cassette is usually the most important factor involved in the selection of a given cassette.

Obviously, there has been a long standing need for a cassette receptacle which incorporates thermal protection from excessive heat as well as simplicity in cassette identification and selection. As a consequence the development of such a device became the focus, purpose and objective of the present invention.

BRIEF SUMMARY OF THE INVENTION

The apparatus that forms the basis of the present invention involves a cassette cartridge storage device which comprises an insulating receptacle unit and a protective housing unit; wherein, the receptacle unit comprises an upper and a lower storage member having stepped portions which are designed and configured to accommodate the cassettes in a staggered disposition for easy viewing and selection.

In addition, the receptacle unit is specifically designed to thermally insulate heat sensitive cassettes from temperatures. This functional objective is achieved by forming the receptacle unit out of an insulating material that has had selected portions removed to produce the staggered storage arrangement mentioned previously.

As would be expected, the housing unit comprises an upper and lower rigid casing that are hingedly connected to one another and configured to envelope the receptacle unit and the cassettes that are contained therein.

As mentioned earlier on, the staggered disposition of the cassettes serves to provide a partial view of the front cover of each of the cassettes, and serves to effectively reduce the height of the entire structure. This reduction of height also allows for a more convenient storage of the device.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings, wherein:

FIG. 1 is a perspective view of the storage device for cassettes disposed in its open configuration;

FIG. 2 is a plan view of the top of the device;

FIG. 3 is a perspective view of the device in its closed configuration; and,

FIG. 4 is a cross-sectional view of the device.

BEST MODE FOR CARRYING OUT THE INVENTION

As can be seen by reference to the drawings, the insulated receptacle device that forms the basis of the present invention is designated generally by the reference numeral (10). The insulated receptacle device (10) comprises in general an insulation unit (11) and a housing unit (12). These units will now be described in seriatim fashion.

As can best be seen by reference to FIGS. 1 and 4, the insulation unit (11) comprises an upper (13) and a lower (14) insulation member; wherein, each of the insulation members (13) and (14) are provided with a contoured central recess (15) (15'). The insulation members (13) (14) are further fabricated from a thermal insulation material (16) such as a closed cell foam or the like; wherein, the central recesses (15) (15') of the insulation members (13) (14) are provided with a generally saw-tooth configuration, whereby an enlarged contoured cavity (17) is formed between the upper (13) and lower (14) insulation units.

Each of the insulation members (13) and (14) are further provided with a generally elongated rectangular external configuration; wherein, the lower insulation member (14) has a depth that is approximately equal to the depth of the upper insulation member (13).

As shown in FIGS. 1 thru 3, the housing unit (12) comprises an upper (18) and a lower (19) housing member that are hingedly connected on one end as at (20) and provided with a cooperating latch mechanism (21) on the other end; wherein, the upper (18) and lower (19) housing members cooperate with one another, to provide a closed receptacle that will envelope the upper (13) and lower (14) insulation members.

Turning once more to FIGS. 1 and 4, it can be seen that the enlarged thermally insulated contoured cavity (17) is dimensioned to receive a plurality of cassette cartridges (100) in a staggered relationship; wherein, the upper portions of the faces (101) of the individual cartridges are at least partially exposed to view when the user opens the upper housing member lid (18).

At this juncture it should be appreciated that each of the teeth in the saw toothed configuration of the enlarged recess (17) have at least one rearwardly angled tooth surface (50) that has a length that is slightly larger than the width of the individual cassettes (100); whereby, the rearwardly angled tooth surfaces (50) are aligned in a parallel relationship to one another and the top and bottom of the cassettes (100) in their staggered disposition.

By virtue of the foregoing arrangement the user is provided with an insulated receptacle device (10) that will thermally protect and display in a staggered fashion a plurality of cassette cartridges (100) that are disposed in the device (10).

Having thereby described the subject matter of this invention it should be obvious that many substitutions, modifications and variations of the invention are possible in light of the above teachings. It is therefore to be understood that the invention as taught and described herein is only to be limited to the extent of the breadth and scope of the appended claims.

I claim:

1. An insulated receptacle device in combination with a plurality of cassette cartridges wherein the insulated receptacle device consists of:

an insulation unit including an upper insulation member and a lower insulation member wherein both insulation members are provided with a central recess which cooperate to define an enlarged contoured cavity that is dimensioned to receive said plurality of cassette cartridges in a staggered disposition; wherein, said upper and lower insulation members are fabricated from a thermal insulation material; the central recesses in said upper and lower insulation members are provided with a sawtooth configuration defined by a plurality of teeth; wherein, each tooth of said sawtoothed configuration has an upwardly angled tooth surface and a rearwardly angled tooth surface whereby said rearwardly angled tooth surfaces are disposed parallel to one another and the upwardly and rearwardly angled tooth surfaces are arranged in an alternating contacting sequential fashion wherein said sawtooth configuration supports said plurality of cassette cartridges; and, a housing unit including an upper housing member and a lower housing member which are hingedly connected on one end and provided with a cooperating latch mechanism on their other end; wherein, the housing members cooperate with one another to provide a closed receptacle that encompasses said insulation unit and said plurality of cassette cartridges.

2. The insulated receptacle device as in claim 1 wherein said rearwardly angled tooth surfaces have a length that is slightly larger than the width of the individual cassette cartridges that comprise said plurality of cassette cartridges, whereby the upper portions of the front face of said cartridges will be partially exposed when the upper housing member is opened.

3. The insulated receptacle device as in claim 1 wherein said thermal insulation material comprises closed cell foam.

* * * * *